(12) United States Patent
Matsuoka et al.

(10) Patent No.: US 7,511,667 B2
(45) Date of Patent: Mar. 31, 2009

(54) PRECISE LOCAL POSITIONING SYSTEMS USING GROUND-BASED TRANSMITTERS

(75) Inventors: Masayoshi Matsuoka, Santa Clara, CA (US); Kurt R. Zimmerman, Mountain View, CA (US); Paul Y. Montgomery, Menlo Park, CA (US); David G. Lawrence, Santa Clara, CA (US)

(73) Assignee: Novariant, Inc., Fremont, CA (US)

( * ) Notice: Subject to any disclaimer, the term of this patent is extended or adjusted under 35 U.S.C. 154(b) by 87 days.

(21) Appl. No.: 11/360,359

(22) Filed: Feb. 22, 2006

(65) Prior Publication Data
US 2007/0194988 A1    Aug. 23, 2007

(51) Int. Cl.
G01S 3/02 (2006.01)
G01S 5/14 (2006.01)
H04B 7/185 (2006.01)

(52) U.S. Cl. .............. 342/464; 342/357.14; 342/357.08

(58) Field of Classification Search ...... 342/357.01–17, 342/464
See application file for complete search history.

(56) References Cited

U.S. PATENT DOCUMENTS

| | | | | |
|---|---|---|---|---|
| 3,715,758 A | * | 2/1973 | Sender | 342/463 |
| 3,883,873 A | * | 5/1975 | Mosyakov et al. | 342/385 |
| 5,774,829 A | * | 6/1998 | Cisneros et al. | 701/213 |
| 5,995,043 A | * | 11/1999 | Murphy | 342/357.03 |
| 6,121,928 A | * | 9/2000 | Sheynblat et al. | 342/463 |
| 6,449,558 B1 | * | 9/2002 | Small | 701/213 |
| 6,473,032 B1 | * | 10/2002 | Trimble | 342/357.14 |
| 6,531,981 B1 | * | 3/2003 | Fuller et al. | 342/357.03 |
| 6,963,304 B2 | * | 11/2005 | Murphy | 342/357.02 |
| 2003/0058163 A1 | * | 3/2003 | Zimmerman et al. | 342/357.08 |
| 2004/0088111 A1 | * | 5/2004 | Ahlbrecht et al. | 701/213 |
| 2004/0119638 A1 | * | 6/2004 | Fagan et al. | 342/357.03 |
| 2005/0001742 A1 | * | 1/2005 | Small | 340/988 |
| 2005/0089128 A1 | * | 4/2005 | McReynolds | 375/354 |
| 2005/0242995 A1 | * | 11/2005 | Ferreol et al. | 342/463 |
| 2006/0022869 A1 | | 2/2006 | Zimmerman et al. | |
| 2006/0022870 A1 | | 2/2006 | Zimmerman et al. | |

(Continued)

FOREIGN PATENT DOCUMENTS

WO    WO 99/63358    5/1999

(Continued)

OTHER PUBLICATIONS

U.S. Appl. No. 10/909,140, filed Jul. 30, 2004, Bauregger et al.

(Continued)

Primary Examiner—Thomas H Tarcza
Assistant Examiner—Harry Liu
(74) Attorney, Agent, or Firm—Perkins Coie LLP

(57) ABSTRACT

A precise positioning method and system is disclosed wherein at least one ground transmitter is used for transmitting a ranging signal with code modulation. The at least one ground transmitter is configured to receive a signal from at least one satellite and a second ground transmitter. The at least one ground transmitter measures a code phase of the received signals. The measured code phase information is communicated to a rover that is associated with a user. The rover can determine the user's precise position based on the measured code and/or carrier phase information and a clock correction model.

19 Claims, 9 Drawing Sheets

U.S. PATENT DOCUMENTS

| | | | |
|---|---|---|---|
| 2006/0022871 A1 | 2/2006 | Zimmerman | |
| 2006/0022872 A1 | 2/2006 | Zimmerman | |
| 2006/0022873 A1 | 2/2006 | Zimmerman | |
| 2007/0040744 A1* | 2/2007 | Zimmerman et al. | 342/464 |
| 2007/0063896 A1* | 3/2007 | Alban et al. | 342/458 |

FOREIGN PATENT DOCUMENTS

| | | |
|---|---|---|
| WO | WO 2005/012935 | 2/2005 |

OTHER PUBLICATIONS

U.S. Appl. No. 10/909,184, filed Jul. 30, 2004, Zimmerman et al.

U.S. Appl. No. 10/909,243, filed Jul. 30, 2004, Zimmerman et al.

Barnes, J., et al., "High Precision Indoor and Outdoor Positioning using LocataNet," School of Surveying and Spatial Information Systems, The University of New South Wales, Australia (UNSW).

Barnes, J., et al., "Locata: a New Positioning Technology for High Precision Indoor and Outdoor Positioning," School of Surveying and Spatial Information Systems, The University of New South Wales, Australia (UNSW).

Barnes, J., et al., "*LocataNet*: Intelligent time-synchronised pseudolite transceivers for cm-level stand-alone positioning," Satellite Navigation and Positioning (SNAP) Group, School of Surveying and Spatial Information Systems, The University of New South Wales, Australia (UNSW).

LeMaster, E.Al, "Self-Calibrating Pseudolite Arrays: Theory and Experiment," A dissertation submitted to the Department of Aeronautics and Astronautics, (May 2002).

Matsuoka, M., "Mars Rover Navigation Using Pseudolite Transceiver Arrays: Network-Based Ranging and Extended Self-Calibration Algorithm," A dissertation submitted to the Department of Aeronautics and Astronautics (Mar. 2005).

Trimbel News Release, entitled Trimble Introduces New Surveying Products For the Connected Survey Site, (Oct. 2005).

* cited by examiner

PRECISE LOCAL POSITIONING SYSTEMS USING GROUND-BASED TRANSMITTERS

TECHNICAL FIELD

The present invention is directed to precise local positioning systems.

BACKGROUND

Local positioning systems that employ a set of ground transmitters need to apply corrections for clock errors that are specific to the given transmitters in order to achieve precise positioning. There are various approaches to account for clock errors in order to achieve precise positioning.

According to one approach, at least one fixed base station is needed for implementing clock error corrections. The base station acts as a reference to provide differential phase measurements. The differential phase measurements are used for clock bias corrections for the ground transmitters. However, the use of a base station for implementing clock error corrections has certain disadvantages.

The location of the base station must be known precisely at a centimeter-level of accuracy. The precise relative or absolute positioning of the base station often requires surveying techniques that employ GPS Real Time Kinematic (RTK) solutions. However, a GPS RTK solution may not be possible at locations with poor or no access to GPS satellites. For example, a GPS RTK solution may not be achievable in a mining pit. Each time the base station is moved, another survey is required to determine the precise location of the base station. Further, the location of the base station must be such that the base station has a direct line of sight to any associated ground transmitters.

According to another approach, ground transmitter clocks can be synchronized to a common clock source in order to mitigate clock errors. An example of a common clock source is GPS time from a satellite. The use of GPS time assumes that the ground transmitters are capable of receiving GPS satellite signals, which assumption may not be valid. Moreover, the use of GPS time can result in unacceptable errors. In practice, the steering of the transmitter clock to a GPS time reference results in residual errors for both carrier-phase and code-phase signals. Such residual errors result in location solution errors that are in excess of GPS RTK accuracies, or 1/10 ns.

According to another approach, atomic clocks can be used in each ground transmitter. The clock drift of an atomic clock is negligible for purposes of precise positioning solutions. However, the expense and size of atomic clocks make atomic clocks impractical for low-cost, portable commercial applications.

Thus, in view of the above problems, there is a need for a method and system for implementing a precise positioning system at a centimeter-level of accuracy without resorting to the use of a base station, synchronization of transmitter clocks to GPS time, or the use of atomic clocks.

SUMMARY OF THE INVENTION

According to one aspect of certain non-limiting embodiments, a position solution can be determined using at least one ground transmitter and excluding a base station. The ground transmitter transmits a ranging signal with code modulation and can receive signals from a satellite or from another ground transmitter. The ground transmitter is used for communicating the measured code phase to a rover.

According to another aspect of certain non-limiting embodiments, a position solution includes using at least one ground transmitter, excluding a base station, for transmitting a wideband ranging signal to a rover and for tracking either a satellite or another ground transmitter. The rover uses the wideband ranging signal that is received from the ground transmitter to determine the position solution.

According to yet another aspect of certain non-limiting embodiments, a position solution includes generating a clock model based on a transmitter clock of a ground transmitter and a clock reference for determining the position solution within a one meter level of accuracy.

DETAILED DESCRIPTION

According to certain non-limiting embodiments, at least one ground transmitter is used for transmitting a ranging signal with code modulation. Such a ground transmitter is configured to receive a signal from at least one of a satellite and a second ground transmitter. Further, the ground transmitter measures a code phase of the signals received from the satellite. The ground transmitter communicates the measured code phase and ranging signals to a rover associated with a user. The rover can determine the user's precise position based on the measured code phase information and ranging signals that are received from the ground transmitter. According to some embodiments, the clock model is generated at the ground transmitter and is then conveyed to the rover. According to certain other embodiments, the rover can generate a clock model based on raw code phase information received from the ground transmitters.

In certain embodiments, only one ground transmitter is used in conjunction with two or more satellites. For example, one ground transmitter is used in conjunction with three satellites for implementing a 3-D position solution. Similarly, one ground transmitter is used in conjunction with two satellites for implementing a 2-D position solution. Thus, for 3-D position solutions, the number of ground transmitters can vary from one to four and the corresponding number of satellites can vary from three to none, to make a total of at least four components that are transmitting information to a rover. Each ground transmitter and each satellite is considered a component. Similarly, for 2-D position solutions, the number of ground transmitters can vary from one to three and the corresponding number of satellites can vary from two to none, to make a total of at least three components that are transmitting information to a rover.

Figure 1:
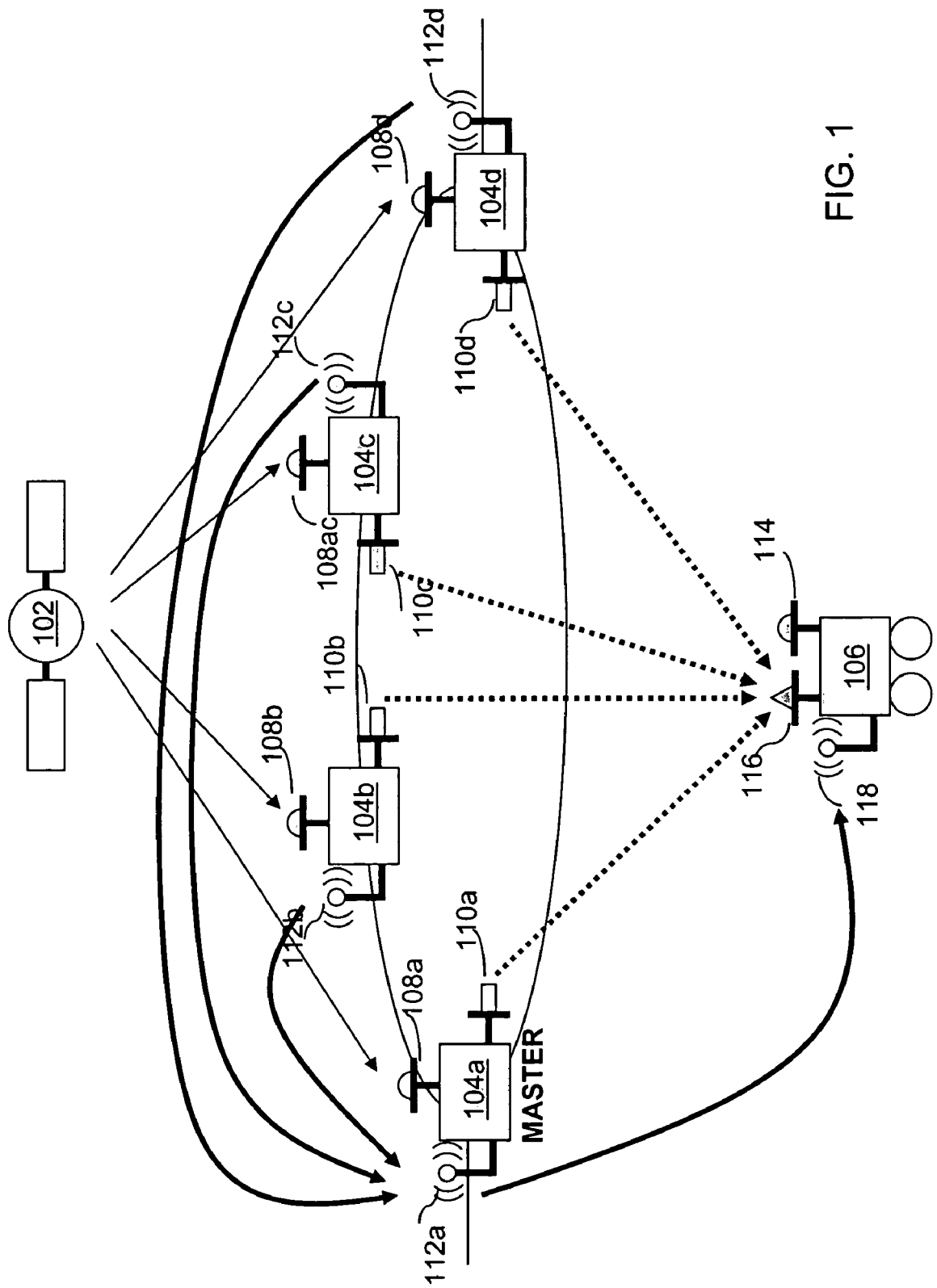
FIG. 1 is a high-level block diagram that illustrates the use of ground transmitters for implementing a precise positioning solution, according to certain embodiments.

FIG. 1 is a high-level block diagram that illustrates the use of four ground transmitters for implementing a precise positioning solution, according to certain embodiments. FIG. 1 shows a satellite 102, four ground transmitters 104a, 104b, 104c, 104d and a rover 106. According to certain embodiments, each ground transmitter is equipped with a corresponding GPS receiver (108a-d), a corresponding transmitter (110a-d) and a corresponding wireless data link (112a-d). The wireless data link is optional. Rover 106 can include a ground transmitter receiver 116, an optional GPS receiver 114, and an optional data link 118.

According to certain embodiments, one of the ground transmitters is designated as a master ground transmitter. The master ground transmitter is placed at a pre-surveyed location. Unlike a base station, the master ground transmitter transmits ranging signals to the rover. A base station does not transmit ranging signals.

In the case where one of the ground transmitters is designated as a master ground transmitter, the other ground transmitters are surveyed relative to the master ground transmitter at an accuracy level that is within one centimeter, using a GPS RTK survey, for example. In another embodiment, the ground transmitters may attain accurate one-centimeter survey locations by finding an optimal-fit solution to a collection of independent coarse position measurements, each coarse position measurement being a non-RTK position measurement of a ground transmitter and being much less accurate than one-centimeter. The GPS satellite 102 transmits ranging signals that can be received by each of the ground transmitters for calculating a corresponding transmitter clock model. Each ground transmitter can transmit a ranging signal with code modulation. The implementation of a precise positioning solution is described in greater detail herein with reference to FIG. 2.

Figure 2:
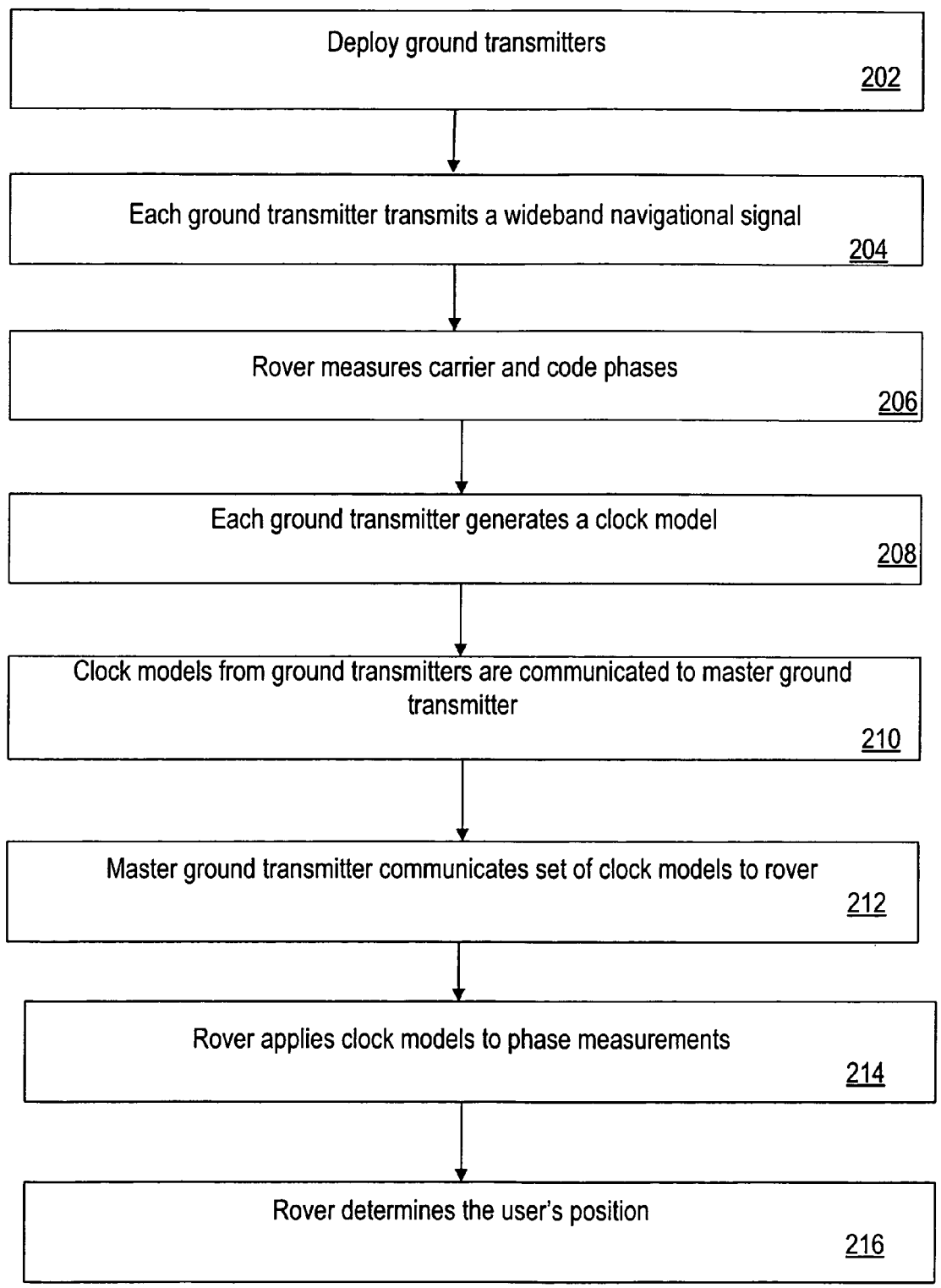
FIG. 2 is a flowchart that illustrates some high-level steps for implementing a precise positioning solution, according to certain embodiments.

FIG. 2 is a flowchart that illustrates some high-level steps for implementing a precise positioning solution, according to certain embodiments. FIG. 2 is described with reference to a master ground transmitter. At block 202, four or more ground transmitters are deployed for a 3-D positioning system, assuming that there is access to ranging signals from at least one satellite. One of the ground transmitters is designated as a master ground transmitter according to certain embodiments. As previously explained, for a 2-D positioning system, the number of ground transmitters can vary from one to three and the corresponding number of satellites can vary from two to none.

The master ground transmitter is deployed at a known location that is pre-surveyed in global coordinates, as a non-limiting example. By implementing GPS RTK, the location of each of the other ground transmitters can be surveyed relative to the master ground transmitter. Further, the precise RTK-level GPS time reference ($\tau^{GPS}$) can be resolved.

At block 204, each ground transmitter transmits a wideband navigational signal, according to certain non-limiting embodiments. A wideband navigational signal is a ranging signal of any carrier frequency modulated by a wideband code. The carrier frequency is typically 1 GHz or more. The wideband code has a chipping rate that is fast enough to resolve carrier-phase integer biases. As a non-limiting example, the chipping rate is 30 MHz or faster. The wideband navigational signals (ranging signals) transmitted by the ground transmitters are received by a rover associated with a user who is interested in determining the user's precise position.

At block 206, the rover measures the carrier and code phases based on the ranging signals from the ground transmitters. It is assumed the phase measurements (also referred to as raw data) are corrected for known line biases for calculating clock models and the position solution. The line biases may be pre-calibrated quantities, for example. Each phase measurement ($\phi_{USER}^{GTi}$) is equal to a range ($r_{USER}^{GTi}$) plus the rover clock ($\tau_{USER}$) minus a transmitter clock ($\tau^{GTi}$) plus a noise factor ($\epsilon$):

$$\phi_{USER}^{GTi} = r_{USER}^{GTi} + \tau_{USER} - \tau^{GTi} + \epsilon$$

Figure 3:
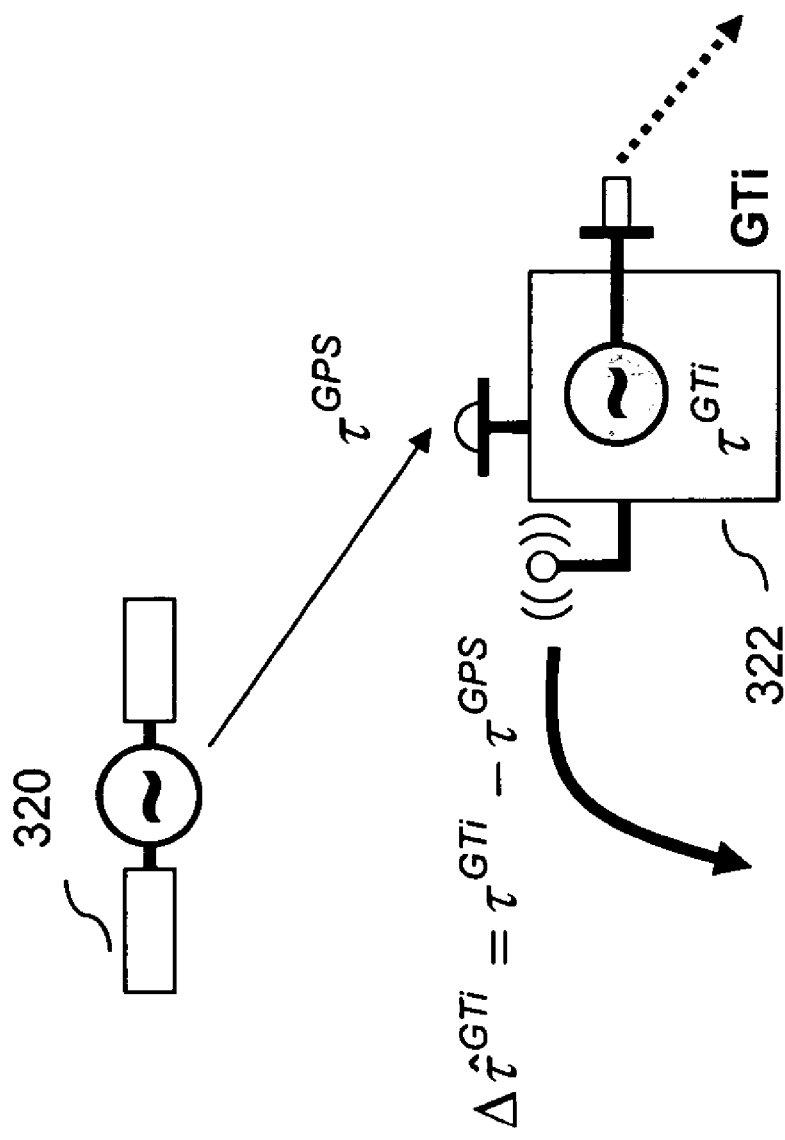
FIG. 3 is a block diagram that illustrates a clock model that uses a GPS time reference.

At block 208, each ground transmitter generates a corresponding transmitter clock model ($\Delta\hat{\tau}^{GTi}$). The transmitter clock model is also referred to herein as processed data because it derives from raw data such as phase measurements. FIG. 3 is a block diagram that illustrates a clock model that uses a GPS time reference. FIG. 3 shows a satellite 320 transmitting the GPS reference time ($\tau^{GPS}$) to ground transmitter 322. The ground transmitter clock model is generated by measuring the difference between the ground transmitter time ($\tau^{GTi}$) and the GPS reference time ($\tau^{GPS}$):

$$\Delta\hat{\tau}^{GTi} = \tau^{GTi} - \tau^{GPS}$$

Therefore, $$\tau^{GTi} = \tau^{GPS} + \Delta\hat{\tau}^{GTi}$$

Figure 4:
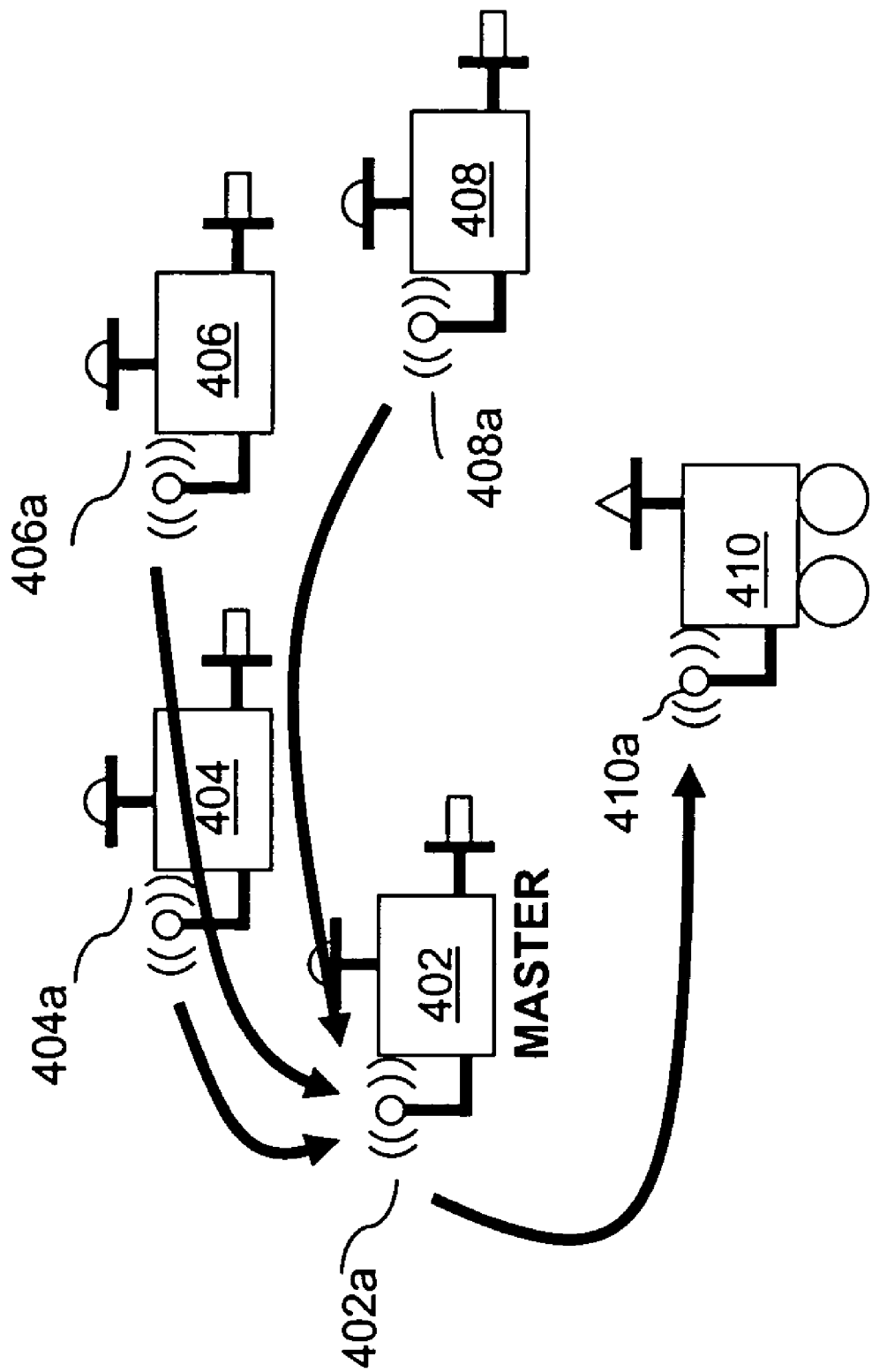
FIG. 4 is a block diagram that illustrates wireless datalink communications of clock models from the ground transmitters to the rover via the master ground transmitter.
Figure 5:
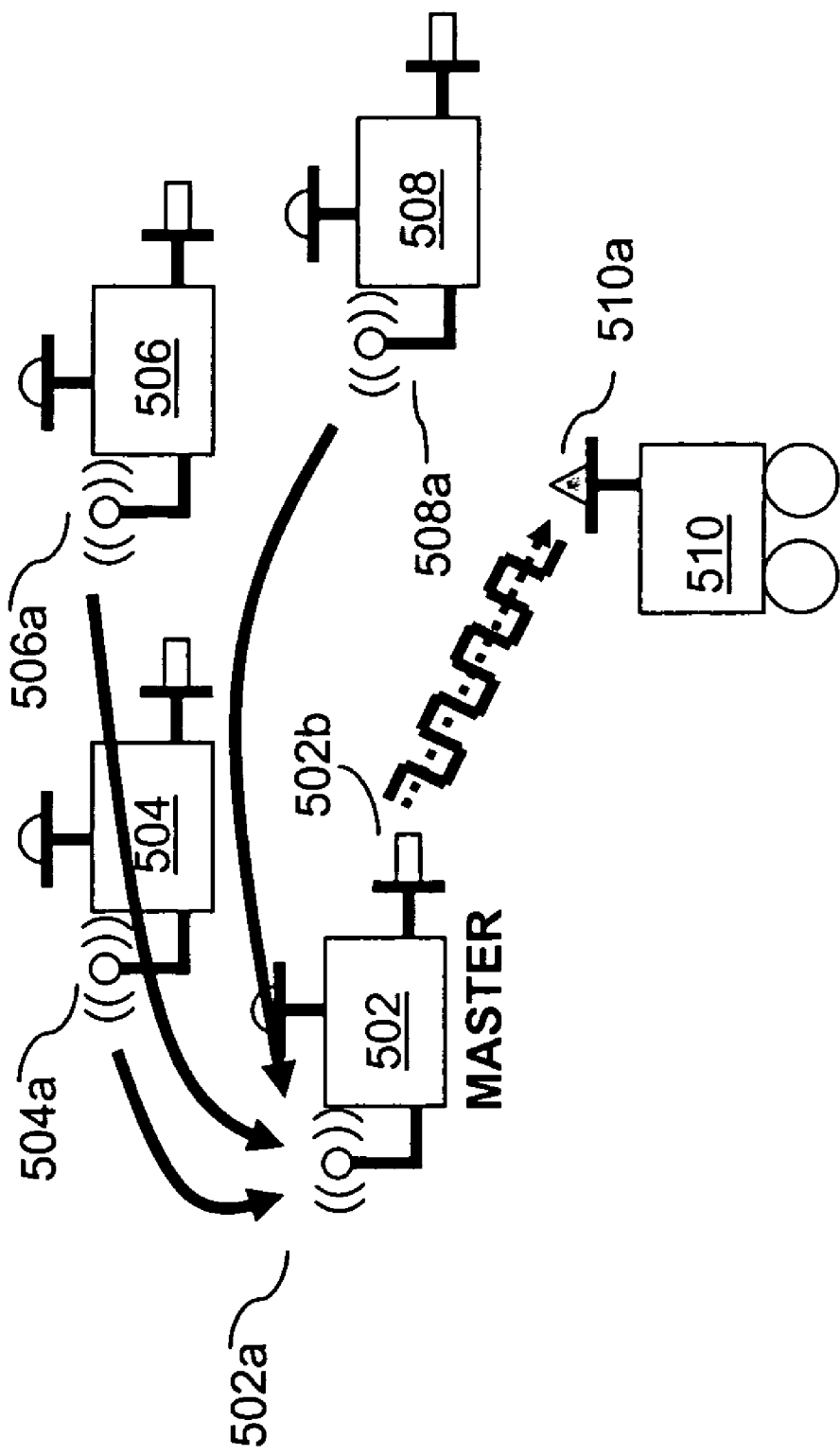
FIG. 5 is a block diagram that illustrates communication of clock models from the ground transmitters to the master ground transmitter using wireless datalinks and communication from the master ground transmitter to the rover using a modulated data message on a ranging signal from the master ground transmitter.

At block 210, each of the ground transmitters, other than the master ground transmitter, communicates its corresponding generated clock model to the master ground transmitter, as described herein with reference to FIG. 4 and FIG. 5. According to certain embodiments, the generated clock models are communicated to the master ground transmitter via wireless datalinks.

At block 212, the master ground transmitter communicates the set of clock models to the rover. According to certain embodiments, the set of clock models is communicated to the rover via wireless datalinks, as described herein with reference to FIG. 4. According to certain other embodiments, the set of clock models is communicated to the rover using a modulated data message on a ranging signal from the master ground transmitter, as described herein with reference to FIG. 5. According to certain other embodiments, instead of communicating the clock models to the master ground transmitter, each of the ground transmitters communicates its corresponding generated clock model to the rover directly, as described herein with reference to FIG. 6 and FIG. 7.

At block 214, the rover applies the set of clock models to the phase measurements.

$$\phi_{USER}^{GTi} = r_{USER}^{GTi} + \tau_{USER} - (\tau^{GPS} + \Delta\hat{\tau}^{GTi}) + \epsilon$$

At block 216, the rover solves the non-linear phase measurement equations to determine the user's position ($X_{USER}$, $Y_{USER}$, $Z_{USER}$) and the clock offset ($\tau_{USER}$) Four or more phase measurement equations can be used to resolve the four unknowns, $\tau_{USER}$, $X_{USER}$, $Y_{USER}$, $Z_{USER}$ using a standard non-linear Least Squares estimate.

FIG. 4 is a block diagram that illustrates wireless datalink communications of clock models from the ground transmitters to the rover via the master ground transmitter. FIG. 4 shows ground transmitters 402, 404, 406, 408 and a rover 410. Each ground transmitter has a corresponding wireless datalink, such as a wireless modem, 402a, 404a, 406a, and 408a. Rover 410 has a wireless datalink 410a. Each ground transmitter communicates its corresponding clock model to the master ground transmitter using the wireless datalinks. The master ground transmitter, in turn, communicates the set of clock models to the rover using wireless datalinks.

FIG. 5 is a block diagram that illustrates communication of clock models from the ground transmitters to the master ground transmitter using wireless datalinks and communication from the master ground transmitter to the rover using a modulated data message on a ranging signal from the master ground transmitter. FIG. 5 shows ground transmitters 502, 504, 506, 508 and a rover 510. Each ground transmitter has a corresponding wireless datalink, such as a wireless modem, 502a, 504a, 506a, and 508a. Master ground transmitter 502 has a transmitter 502b. Rover 510 has a receiver 510a. Each ground transmitter communicates its corresponding clock model to the master ground transmitter using the wireless datalinks. The master ground transmitter, in turn, communicates the set of clock models to the rover using its transmitter 502b. In other words, a modulated data message on a ranging signal from the master ground transmitter is transmitted by transmitter 502b and received by rover 510 through receiver 510a.

Figure 6:
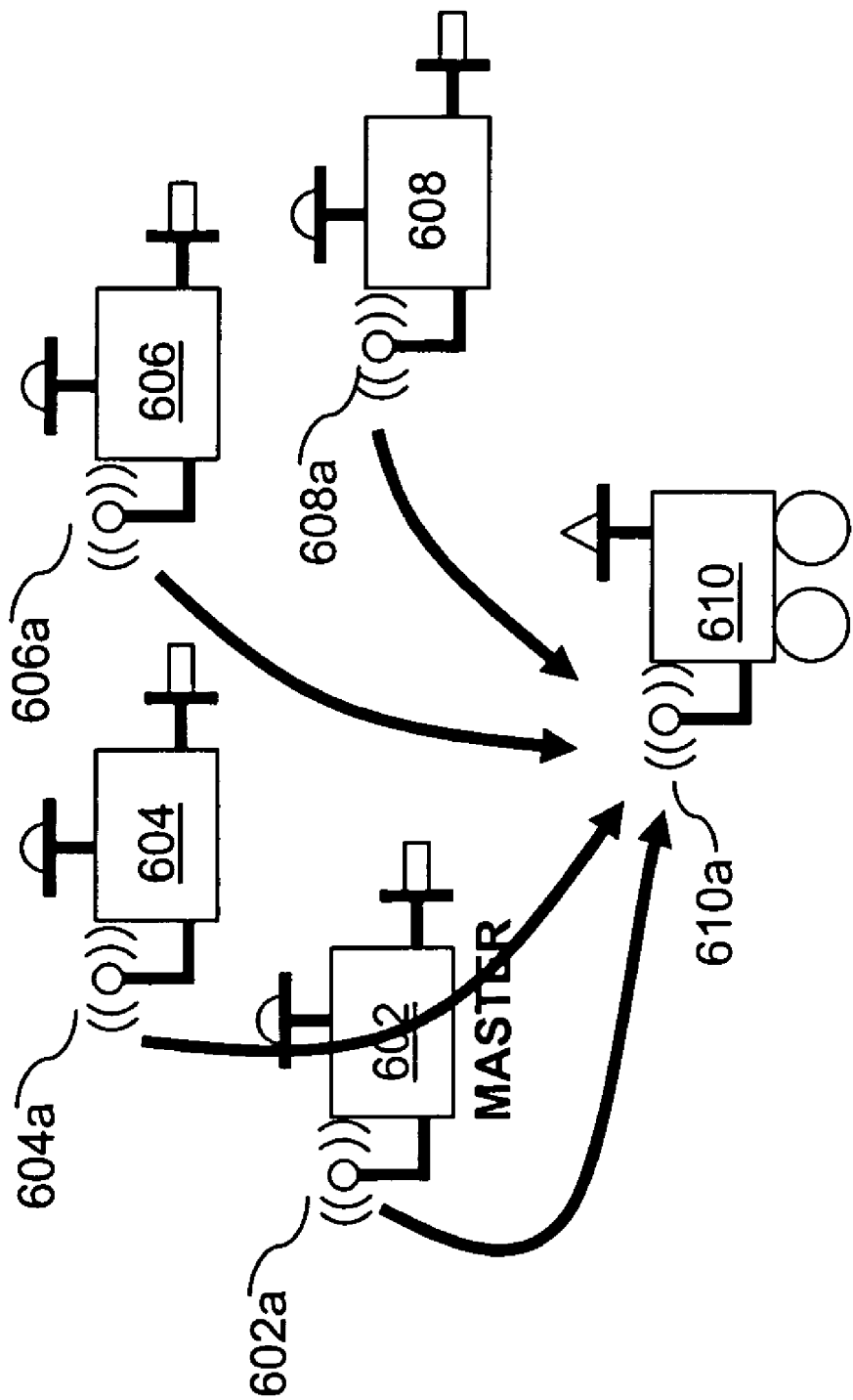
FIG. 6 is a block diagram that illustrates wireless datalink communications of clock models directly from the ground transmitters to the rover.

FIG. 6 is a block diagram that illustrates wireless datalink communications of clock models directly from the ground transmitters to the rover. FIG. 6 shows ground transmitters 602, 604, 606, 608 and a rover 610. Each ground transmitter has a corresponding wireless datalink, such as a wireless modem, 602a, 604a, 606a, and 608a. Rover 610 has a wireless datalink 610a. Each ground transmitter communicates its corresponding clock model to the rover directly using its corresponding wireless datalink.

Figure 7:
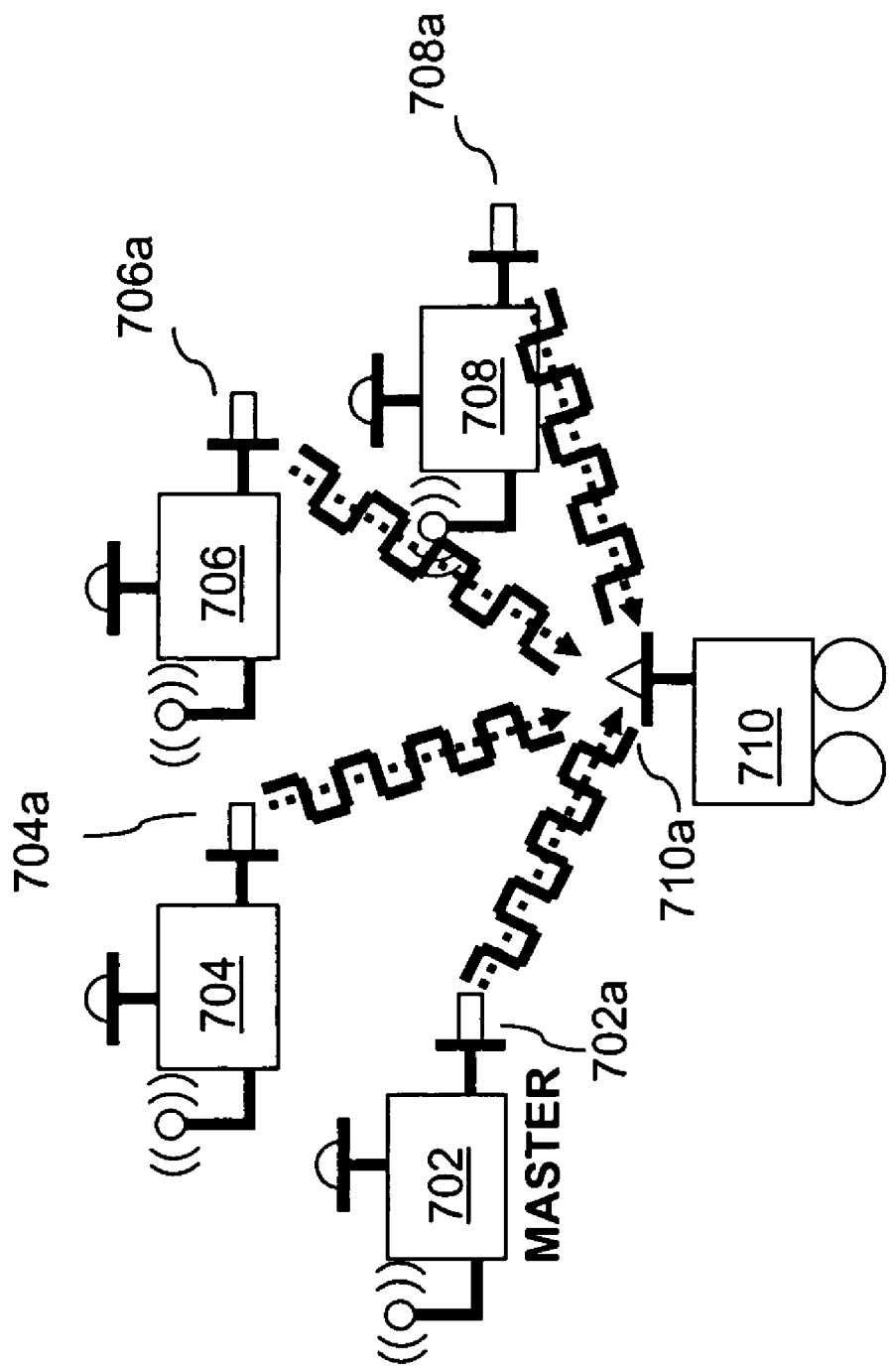
FIG. 7 is a block diagram that illustrates communication of clock models directly from the ground transmitters to the rover using a modulated data message on a corresponding ranging signal from each ground transmitter.

FIG. 7 is a block diagram that illustrates communication of clock models directly from the ground transmitters to the rover using a modulated data message on a corresponding ranging signal from each ground transmitter. FIG. 7 shows ground transmitters 702, 704, 706, 708 and a rover 710. Each ground transmitter has a corresponding transmitter, 702a, 704a, 706a, and 708a. Rover 710 has a receiver 710a. Each ground transmitter communicates its corresponding clock model to the rover directly using its corresponding transmitters. The modulated data message on a ranging signal from each ground transmitter is transmitted by transmitters 702a, 704a, 706a, 708a, and received by rover 710 through receiver 710a.

Figure 8:
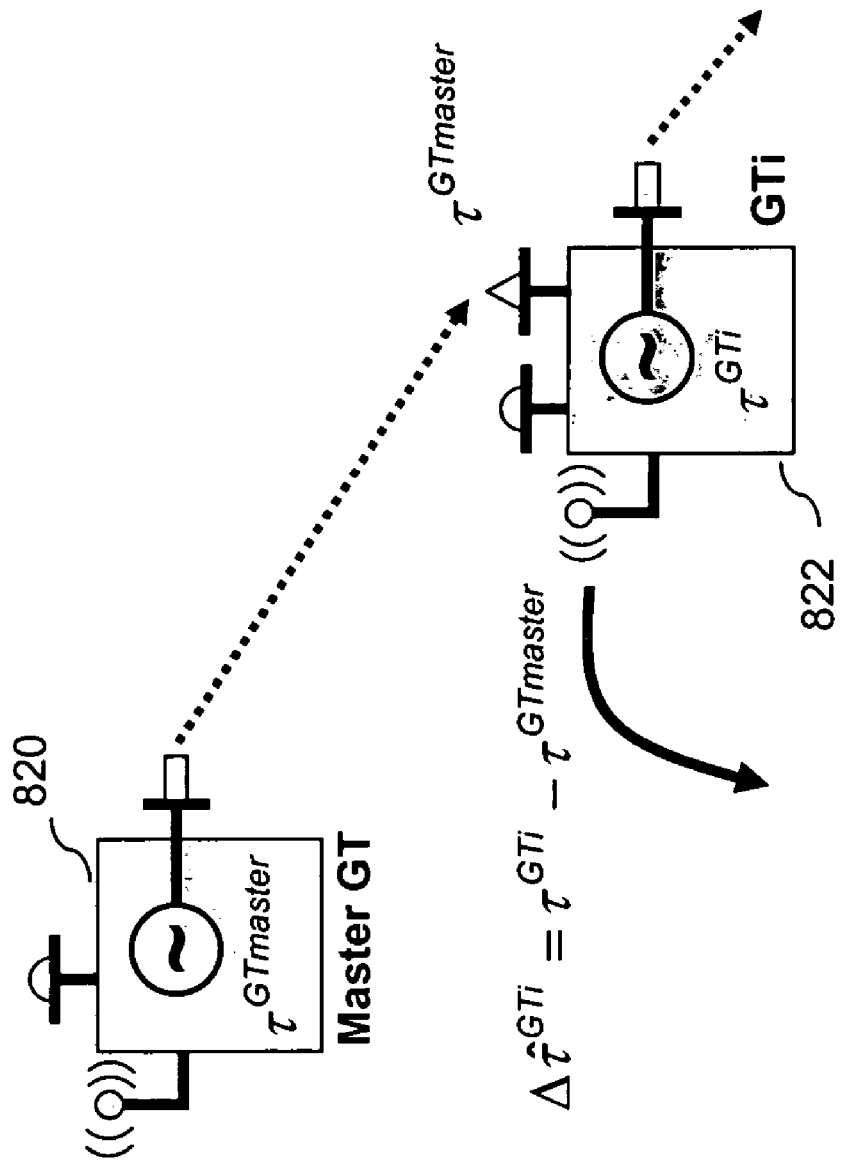
FIG. 8 is a block diagram that illustrates a clock model based on a master ground transmitter clock.

According to certain embodiments, a clock model that is not based on a GPS time reference may be used. According to one non-limiting embodiment, the ground transmitters receive a ranging signal from the master ground transmitter and use the master ground transmitter clock as a time reference. In such an embodiment, the ground transmitters are equipped with ground transmitter receivers for receiving the master ground transmitter ranging signal. FIG. 8 is a block diagram that illustrates a clock model based on a master ground transmitter clock. FIG. 8 shows a master ground transmitter 820 transmitting the master ground transmitter clock ($\tau^{GTmaster}$) to a ground transmitter 822. In such an embodiment, the clock model is the time difference between each corresponding ground transmitter's clock ($\tau^{GTi}$) and the master ground transmitter clock ($\tau^{GTmaster}$):

$$\Delta\hat{\tau}^{GTi} = \tau^{GTi} - \tau^{GTmaster}$$

When generating a clock model based on the received master ground transmitter's ranging signal, geometric propagation delays need to be taken into account. For example, the ranges between the master ground transmitter and the other ground transmitter must be known to centimeter-level accuracy. Centimeter-level accuracy in range can be achieved, for example, by GPS RTK in the pre-survey stage.

Figure 9:
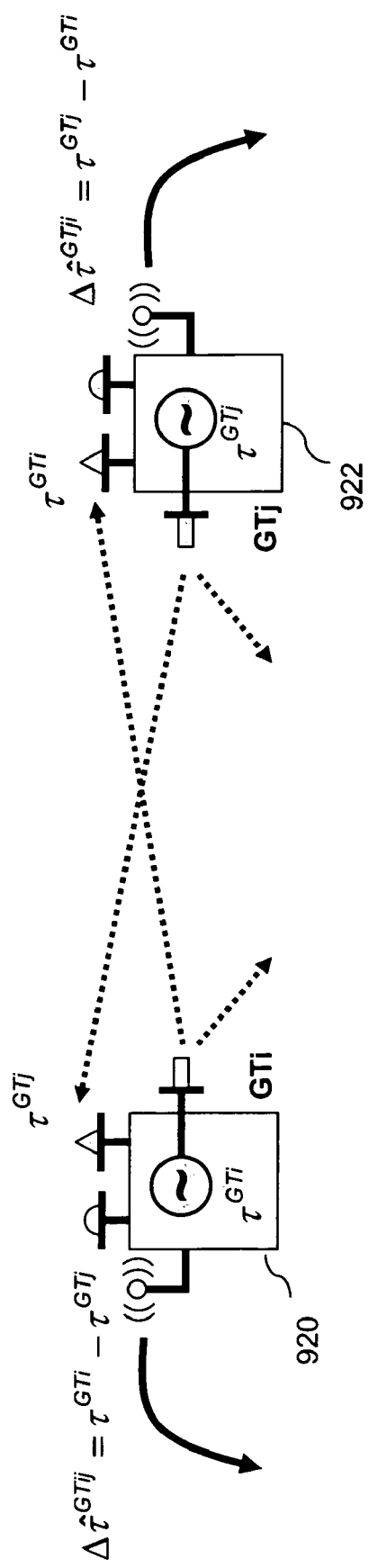
FIG. 9 is a block diagram that illustrates a clock model based on the relative clock difference amongst ground transmitters.

According to another non-limiting embodiment, a relative clock difference amongst the ground transmitters can be used for generating a clock model. In such an embodiment, the ground transmitters need not listen to a specific ground transmitter, such as the master ground transmitter for example, to obtain a common time source. Such an embodiment is useful when some of the ground transmitters may not have direct line-of-sight from the master ground transmitter. FIG. 9 is a block diagram that illustrates a clock model based on the relative clock difference amongst ground transmitters. FIG. 9 shows ground transmitters 920 and 922 transmitting their relative clocks to each other. Each ground transmitter compares its own clock with any other ground transmitter's clock signals for generating relative clock models as follows:

$$\Delta\hat{\tau}^{GTij} = \tau^{GTi} - \tau^{GTj}$$

The collection of the relative clock models are conveyed to the rover associated with the user. The rover can use any one of the available ground transmitter clocks as a reference time. If the relative clock models, $\Delta\hat{\tau}^{GT12} = \tau^{GT1} - \tau^{GT2}$ and $\Delta\hat{\tau}^{GT23} = \tau^{GT2} - \tau^{GT3}$ are conveyed to the rover, the rover can trace out the missing relative clock model, $\Delta\hat{\tau}^{GT13} = \Delta\hat{\tau}^{GT12} - \Delta\hat{\tau}^{GT23}$.

In the foregoing specification, embodiments of the invention have been described with reference to numerous specific details that may vary from implementation to implementation. The specification and drawings are, accordingly, to be regarded in an illustrative rather than a restrictive sense. The invention is intended to be as broad as the appended claims, including all equivalents thereto.

We claim:

1. A method for determining a position solution, said method comprising:
   transmitting a first ranging signal with code modulation, wherein the first ranging signal is to be transmitted by a first ground transmitter and to be received by a rover;
   receiving a second signal, the second signal to be received by the first ground transmitter from a second ground transmitter;
   determining a ground transmitter time relative to a reference time, the ground transmitter time to be determined by the first ground transmitter based on the second signal received from the second ground transmitter;
   communicating the ground transmitter time relative to the second ground transmitter, the ground transmitter time to be communicated to the rover by the first ground transmitter;
   receiving the first ranging signal, the first ranging signal to be received by the rover; and
   determining a position associated with the rover based on the ground transmitter time relative to the second ground transmitter and the first ranging signal, the position to be determined by the rover without synchronization of the first and second ground transmitters to a common clock source.

2. The method of claim 1, further comprising generating a clock model based on the ground transmitter time relative to the reference time for determining the position within 1 meter level of accuracy; wherein the clock model is generated by the ground transmitter.

3. The method of claim 1, wherein the ground transmitter time relative to the reference time is raw data.

4. The method of claim 1, wherein the code modulation of the first ranging signal has a chipping rate faster than 30 MHz.

5. The method of claim 1, further comprising using a plurality of ground transmitters.

6. The method of claim 5, wherein said plurality of ground transmitters includes a master ground transmitter.

7. The method of claim 2, wherein said plurality of ground transmitters is adapted to receive a ranging signal from said master ground transmitter including information on a master clock and wherein said information on said master clock is used for determining said clock model as a difference between a corresponding ground transmitter clock and said master clock.

8. The method of claim 7, wherein said plurality of ground transmitters compares clock signals for generating a collection of relative clock models, wherein any one relative clock model from said collection of relative clock models can be used as a clock reference for determining said clock model.

9. The method of claim 1, wherein the reference time is used for determining said clock model as a difference between a corresponding ground transmitter clock and said reference time.

10. The method of claim 1, wherein the communicating the ground transmitter time relative to the second ground transmitter is implemented via a wireless data link.

11. The method of claim 1, wherein the communicating the ground transmitter time relative to the second ground transmitter includes using a modulated data message on the first ranging signal of the first ground transmitter.

12. The method of claim 6, further comprising collecting a set of clock models at said master ground transmitter.

13. The method of claim 12, wherein said set of clock models collected at said master ground transmitter is modulated on a ranging signal associated with said master ground transmitter for conveying said set of clock models to said rover.

14. The method of claim 12, further comprising using a wireless data link for communicating said set of clock models to said rover.

15. The method of claim 1, further comprising determining the ground transmitter time relative to the reference time; wherein the ground transmitter time is determined by the first ground transmitter based on the second signal received from the satellite.

16. A system for determining a position of a rover, said system comprising:
at least one ground transmitter communicatively coupled to a second ground transmitter, wherein said at least one ground transmitter is operatively configured to, when in operation, transmit a wideband ranging signal; and to determine a transmitter time relative to a reference time based on the second ground transmitter;
a rover communicatively coupled to the at least one ground transmitter, wherein said rover: is operatively configured to, when in operation, receive said wideband ranging signal from the at least one ground transmitter and to determine said position of the rover based on said wideband signal without a need for synchronization of the at least one around transmitter to a common clock source and wherein said position of the rover is determined within one meter level of accuracy.

17. The system of claim 16, wherein the at least one ground transmitter is further operatively configured to generate a clock model for determining said position associated with the rover wherein said clock model is generated based on the transmitter time of said at least one ground transmitter relative to the reference time.

18. A transmitter method for determining a position, said transmitter method comprising:
transmitting a ranging signal with code modulation to an external rover;
receiving a second ranging signal from another transmitter;
determining the transmitter clock based on the second ranging signal received from the another transmitter;
determining a relative transmitter clock, the relative transmitter clock to be determined based on the transmitter clock relative to a reference clock without a need for synchronization of the transmitter and the other transmitter to a common clock source; and
generating a clock model based on relative transmitter clock.

19. The method of claim 18, further comprising communicating with said external rover to transmit the clock model, the external rover to determine the position that is associated with said external rover based on the ranging signal and the clock model; wherein said position to be substantially within one meter level of accuracy.

* * * * *